United States Patent
Zhong

(10) Patent No.: US 9,006,166 B2
(45) Date of Patent: Apr. 14, 2015

(54) BRANCHED ALKOXYLATE SURFACTANT COMPOSITION

(75) Inventor: Ling Zhong, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/344,459

(22) PCT Filed: Sep. 27, 2011

(86) PCT No.: PCT/CN2011/080212
§ 371 (c)(1),
(2), (4) Date: Mar. 12, 2014

(87) PCT Pub. No.: WO2013/044442
PCT Pub. Date: Apr. 4, 2013

(65) Prior Publication Data
US 2014/0349910 A1    Nov. 27, 2014

(51) Int. Cl.
*C11D 1/72*    (2006.01)
*C11D 1/722*    (2006.01)
*C11D 1/825*    (2006.01)
*B01F 17/00*    (2006.01)
*C11D 3/20*    (2006.01)

(52) U.S. Cl.
CPC  *C11D 1/72* (2013.01); *C11D 1/825* (2013.01); *B01F 17/0092* (2013.01); *C11D 3/2068* (2013.01)

(58) Field of Classification Search
CPC .......... C11D 1/72; C11D 1/722; C11D 1/825
USPC .................................. 510/421, 475
See application file for complete search history.

(56) References Cited

U.S. PATENT DOCUMENTS

| 5,364,552 | A | * | 11/1994 | Merz et al. | 510/340 |
| 2007/0123447 | A1 | * | 5/2007 | Killeen et al. | 510/475 |
| 2008/0188396 | A1 | * | 8/2008 | Holland et al. | 510/421 |
| 2009/0023820 | A1 | | 1/2009 | Dailey et al. | |
| 2011/0260101 | A1 | | 10/2011 | Rittig et al. | |

FOREIGN PATENT DOCUMENTS

WO    2010/070088 A1    6/2010

* cited by examiner

*Primary Examiner* — Brian P Mruk
(74) *Attorney, Agent, or Firm* — Whyte Hirschboeck Dudek S.C.

(57) ABSTRACT

A composition is described containing a branched nonionic surfactant of Formula (I): (I) wherein x is a real number from 1 to 11, y is a real number from 1 to 20, R 1 is an alkyl group having 1 to 3 carbon atoms, R 2 is an alkyl group having 4 to 6 carbon atoms, and a primary 5 alcohol ethoxylate.

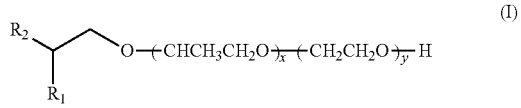

13 Claims, 1 Drawing Sheet

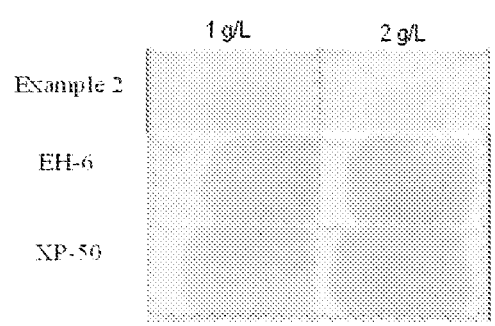

BRANCHED ALKOXYLATE SURFACTANT COMPOSITION

CROSS REFERENCE TO RELATED APPLICATION

The present application is the national phase of PCT Patent Application No. PCT/CN2011/080212 filed Sep. 27, 2011, the entire content of which is incorporated by reference herein.

BACKGROUND OF THE INVENTION

This invention relates to a composition comprising a branched, nonionic alkoxylate surfactant.

Currently, there is a strong market preference for surfactants that are readily biodegradable and environmentally acceptable. Alkyl phenol ethoxylate (APE) is commonly used in textile, cleaning, and agrochemical formulations, among other applications. However, due to stricter environmental regulation, the use of APE type surfactant is drastically declining. Suppliers are positioning to provide other surfactants to replace APE.

Branched alcohol alkoxylate surfactants are widely accepted as an alternative to APE surfactants. For example, LUTENSOL™ XP, a surfactant manufactured and sold by BASF comprising ethylates of alkyl polyethylene glycol ethers based on the C10-Guerbert alcohol, is a benchmark in textile pretreatment process. However, while the APE-free surfactants have good performance profiles in some selected applications, they are not ideal for a variety of applications which require low surfactant concentration, such as those requiring a concentrations less than 1 gram/Liter (g/L). Thus, what is needed is to improve the branched alcohol alkoxylate surfactant performance at low concentration.

SUMMARY OF THE INVENTION

Generally, linear surfactants show good oil-removing and emulsification performance due to close interfacial arrangement of hydrophobic chains. In contrast, branched surfactants usually exhibit good wetting and penetration performance, but poor oil-removing performance compared to linear surfactants. This invention is to develop a new surfactant formulation, which comprises a branched alcohol alkoxylate surfactant and a primary alcohol ethoxylate surfactant. Compared with each individual component alone, the formulated surfactant exhibits better wetting and penetration performance than the branched surfactant when used alone, and better oil-removing performance than the linear surfactant when used alone.

In one embodiment the invention is a non-aqueous composition which includes a branched nonionic surfactant of Formula (I)

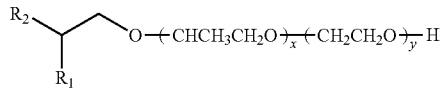

Formula (I)

wherein x is an integer from 1 to about 11, y is an integer from 1 to about 20, $R_1$ is an alkyl group having 1 to 3 carbon atoms (i.e., C1-C3), and $R_2$ is a alkyl carbon chain having 4 to 6 carbon atoms (C4-C6). Preferably x is from 4 to 6, more preferably x is 5. Preferably y is 3, 6 or 9. Preferably $R_1$ is ethyl (C2) or propyl (C3). The composition also includes a primary alcohol ethoxylate of Formula (II).

(II)

In an embodiment, the invention is a solution comprising a non-aqueous composition at a concentration of 0.5 g/L in water, wherein the composition includes a branched nonionic surfactant of Formula (I) and a primary alcohol ethoxylate of Formula (II).

BRIEF DESCRIPTION OF THE DRAWINGS

The FIGURE is a photo of treated stained fabric with inventive example 2 and comparative samples 3 and 5.

DETAILED DESCRIPTION

Surfactant Composition

The non-aqueous composition of the present disclosure comprises a branched nonionic surfactant and a primary alcohol ethoxylate.

Branched Nonionic Surfactant

The composition of the present invention includes a branched nonionic surfactant of Formula (I)

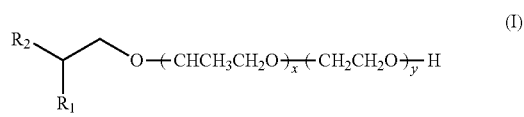

(I)

wherein x is an integer from 1 to about 11, y is an integer from 1 to about 20, $R_1$ is an alkyl group having 1 to 3 carbon atoms (i.e., $C_1$-$C_3$), and $R_2$ is an alkyl carbon chain having 4 to 6 carbon atoms ($C_4$-$C_6$). Preferably x is from 4 to 6, more preferably x is 5. Preferably y is 3, 6 or 9. Preferably $R_1$ is ethyl ($C_2$) or propyl ($C_3$). Preferably $R_2$ is butyl ($C_4$) or pentyl ($C_5$).

In an embodiment, the branched nonionic surfactant is a biodegradable, nonionic surfactant, such as, 2-ethyl hexanol alkoxylate, wherein $R_1$ is ethyl, $R_2$ is butyl, x is 5 and y is 3, 6 or 9.

The branched nonionic surfactant is biodegradable (greater than 60 percent biodegradation within 28 days per OECD 301F), has low aquatic toxicity ($EC_{50}$>10 mg/L), and is not a source of volatile organic compounds. These surfactants exhibit acceptable surface tension reduction, narrow gel range, excellent wetting and penetration in hard surface applications, and have low foaming properties.

The composition comprises from 70 to 90 weight percent (wt %) of the branched nonionic surfactant, based on the weigh of the total composition. Preferably, the composition comprises from 85 to 95 wt % of the branched nonionic surfactant.

Primary Alcohol Ethoxylate

The composition of the present disclosure also includes a primary alcohol ethoxylate of Formula (II).

(II)

Preferably, the primary alcohol ethoxylate is a linear alcohol ethoxylate wherein $R_4$ has ten to sixteen ($C_{10-16}$) carbon atoms and z is from 1 to 20. Preferably, the number of repeating ethoxylate units is 3, 5, 7 or 9. In one embodiment, $R_4$ can be a $C_{10-16}$ branched or linear alkyl.

The non-aqueous composition comprises from 5 to 30 wt % of the primary alcohol ethoxylate, based on the weigh of the total composition. Preferably, the non-aqueous composition comprises from 5 to 55 wt % of the primary alcohol ethoxylate.

The non-aqueous composition comprises from 70 to 90 wt % of the branched nonionic surfactant of Formula (I) and from 5 to 30 wt % of the primary alcohol ethoxylate of Formula (II), based on the weigh of the total composition. In an embodiment, the non-aqueous composition consists essentially of 70 to 90 wt % of the branched nonionic surfactant of Formula (I) and from 5 to 30 wt % of the primary alcohol ethoxylate of Formula (II), based on the weigh of the total composition.

Surfactant Solution

This disclosure further provides a surfactant solution comprising the non-aqueous composition at a concentration from 0.1 g/L to 2.5 g/L in water. Preferably the water is deionized water. Tap water or hard water are less preferred as their use may cause insolubility of the surfactants. Preferably, the concentration is from 0.3 g/L to 0.7 g/L, and most preferably a concentration of 0.5 g/L.

The surfactant solution may further comprise other additives, e.g., antioxidants, pigments, salts, alkali, enzymes, among others.

In an embodiment, the surfactant solution has a critical micelle concentration of less than 350 ppm, preferably less than 200 ppm, and most preferably less than 160 ppm.

The disclosed surfactant solution may be used in a wide variety of applications, especially hard surface cleaning, textile processing, and wetting of both hard and soft surfaces. The surfactant solution is particularly advantageous in applications that require a low concentration of surfactant solution, for example, as a scouring agent in textile pretreatment processes.

It is contemplated that the surfactant solution may be manufactured and sold as a concentrate. A typical concentrate is delivered to the end user who then dilutes the concentrate with water to produce a final working solution. The surfactant solution may be manufactured and sold as a concentrate comprising the 70 to 99 wt % of the non-aqueous composition in water.

SPECIFIC EMBODIMENTS

Sample Preparation

The surfactant composition is prepared by mixing the branched nonionic surfactant of Formula (I) with the primary alcohol ethoxylate of Formula (II) under agitation at 40° C. for at least two hours, after which the surfactant composition is cooled to room temperature before use. Surfactant solutions of 0.5 g/L and 2.0 g/L are made by diluting the surfactant composition in deionized water.

Testing Methods

Wetting/Penetration Times: The wetting/penetration property of a surfactant is defined as the length of time a surfactant solution takes to wet/penetrate a cotton griege. One liter surfactant solutions of both 0.5 g/L and 2.0 g/L are prepared and placed in individual cups. The cotton griege is placed on the surface of the surfactant solution. The wet time is the time it takes the cotton griege to become completely wet, i.e., the surface of the cotton griege is covered by water according to visual inspection. The penetrating time is the time it takes for the cotton griege to sink below the surface of the surfactant solution. Typically, the times are measured in seconds (s).

Alkali Tolerance: Nonionic surfactants typically have low alkali resistant capabilities which limit the application of surfactants in alkaline conditions, such as in textile processes Alkali tolerance is determined by preparing a series of sodium hydroxide aqueous solutions of different concentrations, e.g., 20 g/L, 30 g/L, 40 g/L and 60 g/L. The surfactant composition is dissolved in the sodium hydroxide solution under agitation. The solutions are incubated for two hours and the appearance is the solution is subsequently observed. If after two hours the solution remains clear, then it is known the surfactant composition can be used at this alkaline concentration. If, however, the solution is turbid or phase separation occurs, then the surfactant composition cannot tolerate such alkaline concentrations.

Emulsification Test: Emulsification is another important criterion to evaluate the performance of surfactant compositions. A surfactant solution of 1 g/L is prepared. 20 milliliters (mL) of the surfactant solution and 20 mL of liquid paraffin are combined in a 100 mL cylinder in a water bath at 34° C. for 1 minute. The cylinder is shaken up and down 10 times and is let to stand for 1 minute. The shaking step is repeated 5 times after which the 10 mL separation time is recorded. The longer the time to separate indicates greater emulsification ability.

Critical Micelle Concentration (CMC): CMC is defined as the concentration of surfactants above which micelles are spontaneously formed. Surfactants only work well at concentrations above their CMC value. The CMC is determined by preparing a series of surfactant aqueous solutions of different concentrations which are incubated for 30 minutes at room temperature. The surface tension is measured in terms of dyne/centimeters using a Wilhelmy plate. A graph of surface tension as a function of the logarithm of the concentrations is prepared. The CMC value is defined as the point at which the two lines intersect; the baseline of minimal surface tension and the slope where surface tension shows linear decline.

Oil Removing Properties: Machine oil stained fabrics are prepared by dipping polyester fabrics into a staining oil material and allowed to dry for 1 minute at 180° C. The stained fabric is placed in 100 mL of surfactant solution of 1 g/L or 2 g/L at 100 C for 40 minutes. The fabric is then rinsed with water and allowed to dry. Visual inspection of the stained fabric is used to indicate the oil removing properties.

Table 1 below demonstrates the acceptable ratios of branched nonionic surfactant (BNS) to primary alcohol ethoxylate (PAE). The surfactant composition of the present disclosure has both wetting and penetration times which are much aster than either individual component alone, especially for the low concentration solutions of 0.5 g/L. However, the solutions at higher concentrations of 2 g/L, the addition of the primary alcohol ethoxylate does not affect the wetting and penetration times to the degree it does to the low concentration solutions. For the wetting and penetration times a well as low foaming the preferred ratio of BNS:PAE is 9:1 to 7:3.

Materials.

The branched nonionic surfactant used below, BNS-6, has a chemical structure of Formula (I) wherein $R_1$ is ethyl, $R_2$ is butyl, x is 5, and y is 6. The primary alcohol ethoxylates used below are PAE-7 which has 7 repeating units of ethoxylate and PAE-9 which has 9 repeating units of ethoxylate.

TABLE 1

Percent Compositions of Surfactant Compositions

| Ratio (BNS:PAE) | BNS | PAE | 0.5 g/L Concentration | | 2 g/L Concentration | |
|---|---|---|---|---|---|---|
| | | | Wetting (s) | Penetration (s) | Wetting (s) | Penetration (s) |
| 1:0 | BNS-6 | — | >3000 | >3000 | 9.8 | 10.6 |
| 9:1 | BNS-6 | PAE-7 | 39.2 | 137.6 | 9.2 | 10.3 |
| 8:2 | BNS-6 | PAE-7 | 37.4 | 127.6 | 8.8 | 9.7 |
| 7:3 | BNS-6 | PAE-7 | 38.5 | 113.2 | 9.2 | 9.9 |
| 6:4 | BNS-6 | PAE-7 | 37.3 | 171.1 | 11.3 | 12.2 |
| 5:5 | BNS-6 | PAE-7 | 40.0 | 200.8 | 11.9 | 12.8 |
| 4:6 | BNS-6 | PAE-7 | 44.4 | 169.5 | 13.3 | 14.1 |
| 3:7 | BNS-6 | PAE-7 | 39.4 | 165.1 | 15.0 | 15.0 |
| 0:1 | — | PAE-7 | 125.4 | 192.5 | 35.6 | 35.7 |
| 9:1 | BNS-6 | PAE-9 | 86.9 | 115.3 | 8.7 | 9.4 |
| 8:2 | BNS-6 | PAE-9 | 92.0 | 174.7 | 10.8 | 11.5 |
| 7:3 | BNS-6 | PAE-9 | 106.2 | 210.8 | 12.4 | 12.9 |
| 6:4 | BNS-6 | PAE-9 | 213.2 | 240.7 | 15.7 | 15.7 |
| 5:5 | BNS-6 | PAE-9 | 283.9 | 285.4 | 20.5 | 20.5 |
| 4:6 | BNS-6 | PAE-9 | 470.3 | 470.3 | 30.9 | 30.9 |
| 3:7 | BNS-6 | PAE-9 | 599.7 | 599.7 | 55.3 | 55.3 |
| 2:8 | BNS-6 | PAE-9 | 1645.1 | 1645.1 | 109.0 | 109.0 |
| 0:1 | — | PAE-9 | >3000 | >3000 | 414.7 | 414.7 |

Inventive Examples 1-4

Materials. The branched nonionic surfactants used in the inventive examples (IE) all have a chemical structure of Formula (I) wherein $R_1$ is ethyl, $R_2$ is butyl, x is 5, and y is either 3 (BNS-3), 6 (BNS-6) or 9 (BNS-9).

The primary alcohol ethoxylates used below are of Formula (II) in which PAE-7 has 7 repeating units of ethoxylate and PAE-9 has 9 repeating units of ethoxylate. XL-50 and XP-90 refers to LUTENSOL™ XL and XP which are commercially available from BASF. LUTENSOL™ XP and XL are ethoxylates and alkoxylates, respectively, based on a $C_{10}$ Guerbet alcohol.

TABLE 2

Percent composition of Inventive Examples and Comparative Samples

| | IE-1 | IE-2 | IE-3 | IE-4 | CS-1 | CS-2 | CS-3 | CS-4 | CS-5 | CS-6 | CS-7 |
|---|---|---|---|---|---|---|---|---|---|---|---|
| BNS-3 | 90% | — | — | — | 100% | — | — | — | — | — | — |
| BNS-6 | — | 90% | — | — | — | 100% | — | — | — | — | — |
| BNS-9 | — | — | 90% | 90% | — | — | — | — | — | 100% | — |
| PAE-7 | — | 10% | 10% | — | — | — | 100% | — | — | — | — |
| PAE-9 | 10% | — | — | 10% | — | 100% | — | — | — | — | — |
| XL-50 | — | — | — | — | — | — | — | 100% | — | — | — |
| XP-90 | — | — | — | — | — | — | — | — | — | — | 100% |

Table 3 displays the data for inventive example 1 compared to comparative samples (CS) 1 and 2. Inventive example 1 comprising BNS-3 and PAE-9 has faster wetting and penetration times (for both concentrations of 0.5 g/L and 2.0 g/L) than those of comparative sample 1 comprising 100% BNS-3 and comparative sample 2 comprising 100% PAE-9. Inventive example 1 has a much lower CMC value than CS-1 which results in the ability to use IE-1 as a surfactant at lower concentrations than that of CS-1.

TABLE 3

Data for Inventive Example 1 and Comparative Samples 1 and 2

| Composition | CS-1 | CS-2 | IE-1 |
|---|---|---|---|
| Appearance | Opaque emulsion | Clear solution | Translucent emulsion |
| Wetting (0.5 g/L, s) | 364.5 | >3000 | 24.9 |
| Penetration (0.5 g/L, s) | 364.5 | >3000 | 90.8 |
| Wetting (2 g/L, s) | 9.4 | 414.7 | 6.3 |
| Penetration (2 g/L, s) | 12.6 | 414.7 | 7.3 |
| Emulsification (1 g/L, s) | 72.6 | 101.4 | 105.0 |
| CMC (ppm) | 480 | 25 | 346 |

Table 4 compares comparative samples 3-5 to inventive example 2. IE-2 demonstrates faster wetting and penetration times than those of comparative samples 3 and 4. IE-2 does not have faster wetting and penetration times of CS-5 (100% LUTENSOL XP-90), however IE-2 is able to be used at much lower concentrations than CS-5 according to the CMC data.

TABLE 4

Data for Inventive Example 2 and Comparative Samples 3-5

| | CS-3 | CS-4 | CS-5 | IE-2 |
|---|---|---|---|---|
| Appearance | Clear solution | Clear solution | opaque soluble, homogeneous emulsion | Clear solution |
| Wetting (0.5 g/L, s) | >3000 | 125.4 | 23.6 | 39.2 |
| Penetration (0.5 g/L, s) | >3000 | 192.5 | 104.3 | 137.6 |
| Wetting (2 g/L, s) | 9.8 | 35.6 | 4.8 | 9.2 |
| Penetration (2 g/L, s) | 10.6 | 35.7 | 6.1 | 10.3 |

TABLE 4-continued

Data for Inventive Example 2 and Comparative Samples 3-5

| | CS-3 | CS-4 | CS-5 | IE-2 |
|---|---|---|---|---|
| Alkali tolerance (NaOH, g/L) | 25 | 50 | <20 | 35 |
| Emulsification (1 g/L, s) | 64.1 | 112.7 | 77.5 | 99 |
| CMC (ppm) | 914 | 16 | 273 | 157 |

FIG. 1 is a photograph of treated stained fabric with IE-2, CS-3, and CS-5. It is clear from visual inspection that IE-2 has greater oil/stain removing capabilities than CS-3 or CS-5.

Table 5 compares inventive examples 3 and 4 to comparative samples 6, 4, 2 and 7. Inventive examples 3 and 4 have faster wetting and penetration times than CS-6, CS-4, CS-2 and CS-7 for solutions of low concentration, 0.5 g/L. Inventive examples 3 and 4 do not have faster wetting and penetration times for the solutions using a 2 g/L concentration than those of CS-6 and CS-7. However, the inventive examples have the advantage of much lower CMC values than CS-6 and CS-7 which allows the inventive examples to be used effectively at significantly lower concentrations.

TABLE 5

Data for Inventive Examples 3-4 and Comparative Samples 3-5

|  | CS-6 | CS-4 | CS-2 | CS-7 | IE-3 | IE-4 |
| --- | --- | --- | --- | --- | --- | --- |
| Appearance | Clear solution | Clear solution | Clear solution | opaque soluble, homogeneous emulsion | Clear solution | Clear solution |
| Wetting (0.5 g/L) | >3000 | 125.4 | >3000 | >3000 | 164.4 | 2180.3 |
| Penetration (0.5 g/L) | >3000 | 192.5 | >3000 | >3000 | 212.4 | 2180.3 |
| Wetting (2 g/L) | 18.0 | 35.6 | 414.7 | 6.4 | 15.2 | 23.1 |
| Penetration (2 g/L) | 19.1 | 35.7 | 414.7 | 11.4 | 16.3 | 23.3 |
| Alkali tolerance (NaOH, g/L) | 45 | 50 | 50 | 50 | 50 | 50 |
| Emulsification (1 g/L) | 73.8 | 112.7 | 101.4 | 53.3 | 64.4 | 117.4 |
| CMC (ppm) | 1066 | 16 | 25 | 1015 | 105 | 226 |

DEFINITIONS

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure.

Polymer means a polymeric compound prepared by polymerizing monomers, whether of the same or a different type. The generic term polymer thus embraces the term homopolymer, usually employed to refer to polymers prepared from only one type of monomer, and the term interpolymer as defined below.

Although the invention has been described with certain detail through the preceding description of the preferred embodiments, this detail is for the primary purpose of illustration. Many variations and modifications can be made by one skilled in the art without departing from the spirit and scope of the invention as described in the following claims.

The invention claimed is:

1. A non-aqueous composition comprising:
a) a branched nonionic surfactant of Formula (I)

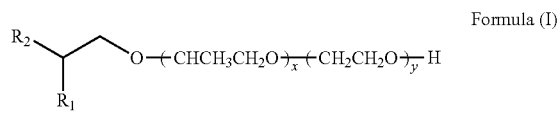

Formula (I)

wherein x is a real number from 4 to 6, y is 3, 6 or 9, $R_1$ is an alkyl group having 1 to 3 carbon atoms, $R_2$ is an alkyl group having 4 to 6 carbon atoms; and b) a linear primary alcohol ethoxylate of Formula (II);

(II)

wherein $R_4$ has ten to sixteen ($C_{10-16}$) carbon atoms and z is 3, 5, 7 or 9.

2. The composition of claim 1 wherein the composition is biodegradable according to the OECD 301, and the branched nonionic surfactant shows greater than 60% biodegradation within 28 days according to OECD 301F.

3. The composition of claim 1 wherein $R_1$ is an ethyl or propyl group.

4. The composition of claim 1 comprising:
a) 70-90 wt % of the branched nonionic surfactant of formula (I); and
b) 5-30 wt % of the linear primary alcohol ethoxylate.

5. The composition of claim 1 comprising:
a) 85-95 wt % of the branched nonionic surfactant of formula (I); and
b) 5-15 wt % of the linear primary alcohol ethoxylate.

6. The composition of claim 1 further comprising an additive and deionized water.

7. A solution comprising the composition of claim 1 and deionized water at a concentration of 0.5 g/L.

8. The solution of claim 7 having a critical micelle concentration of less than 350 ppm.

9. The solution of claim 7 having a critical micelle concentration of less than 200 ppm.

10. A concentrate comprising 70-99 wt % of the non-aqueous composition of claim 1 in water.

11. The composition of claim 1 wherein $R_1$ is an ethyl group and $R_2$ is a butyl group, x is 5 and y is 3, 6 or 9.

12. The composition of claim 1 wherein the ratio of branched nonionic surfactant to linear primary alcohol ethoxylate is from 9:1 to 7:3.

13. The composition of claim 1 wherein the branched nonionic surfactant has an aquatic toxicity $EC_{50}$ of greater than 10 mg/L.

\* \* \* \* \*